A. F. WELCH.
MOTOR DRIVE.
APPLICATION FILED DEC. 17, 1914.

1,193,489.

Patented Aug. 1, 1916.
4 SHEETS—SHEET 1.

Witnesses:
Margaret E. Trolley
Helen Oxford

Inventor:
Alfred F. Welch,
by Albert S. Davis
His Attorney.

A. F. WELCH.
MOTOR DRIVE.
APPLICATION FILED DEC. 17, 1914.

1,193,489.

Patented Aug. 1, 1916.
4 SHEETS—SHEET 4.

Witnesses:
Margaret E. Hooley
Helen Oxford

Inventor:
Alfred F. Welch,
by Albert G. Davis
His Attorney.

ized* # UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

MOTOR-DRIVE.

1,193,489.  Specification of Letters Patent.  Patented Aug. 1, 1916.

Application filed December 17, 1914. Serial No. 877,688.

*To all whom it may concern:*

Be it known that I, ALFRED F. WELCH, a citizen of the United States, residing at Fort Wayne, in the county of Allen, State of Indiana, have invented certain new and useful Improvements in Motor-Drives, of which the following is a specification.

My invention relates to motor drives and is particularly applicable to such drives for sewing machines and has for its object the production of a motor drive which may be used with or without pedal drive, which will be efficient, will operate the machine at any desired speed without complicated apparatus, will be simple and easily controlled, compact, and will not add unduly to the cost of the machine. In order to attain these objects, I provide a motor of a design which will be described in detail hereinafter, attached directly beneath the bed plate of the machine, in position to be readily connected with the drive wheel thereof. In order to control this machine, I provide a system of springs and levers, a circuit closer, and a friction brake. The levers are detachably connected to the treadle of the machine which is otherwise detachably connected with the driving wheel. When the motor is in use, the direct connection between the treadle and the driving wheel is supposed to be broken.

In motor operation, pressure on the treadle first closes the circuit of the motor and thereafter progressively decreases the effectiveness of the brake on the motor to start the same and control the speed thereof. I preferably use a motor having high impedance and its armature and field winding connected in series, and I may, therefore, connect the motor direct to the supply circuit without the interposition of resistance and thus no draw at standstill much more than full load current from the supply mains and also apply maximum power to the sewing machine as soon as the brake is released and the motor starts.

For a better understanding of my invention reference may be had to the following description taken in connection with the accompanying drawings, in which—

Figure 1:
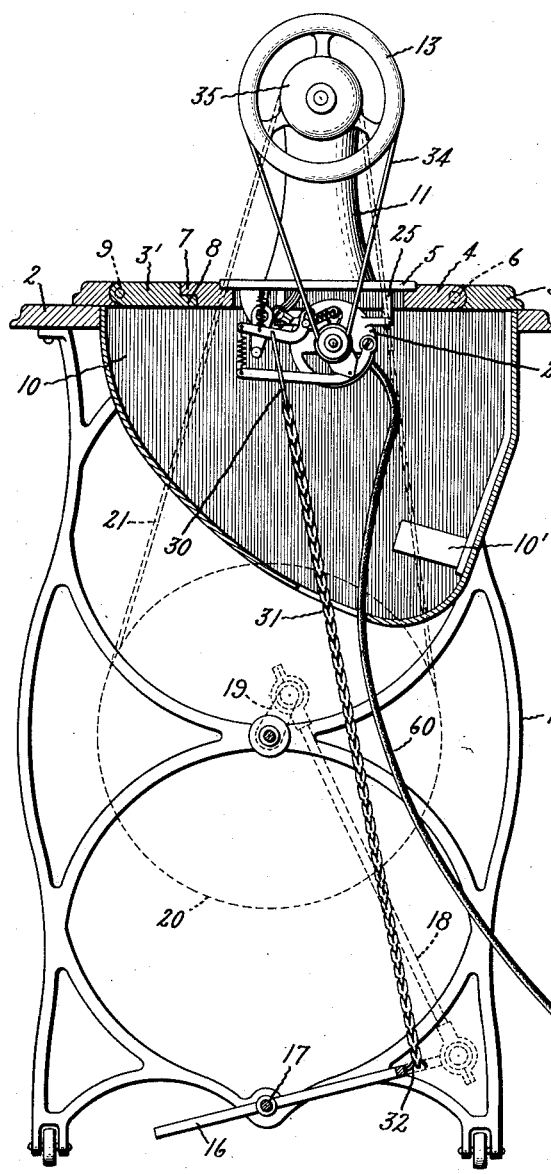
Figure 2:
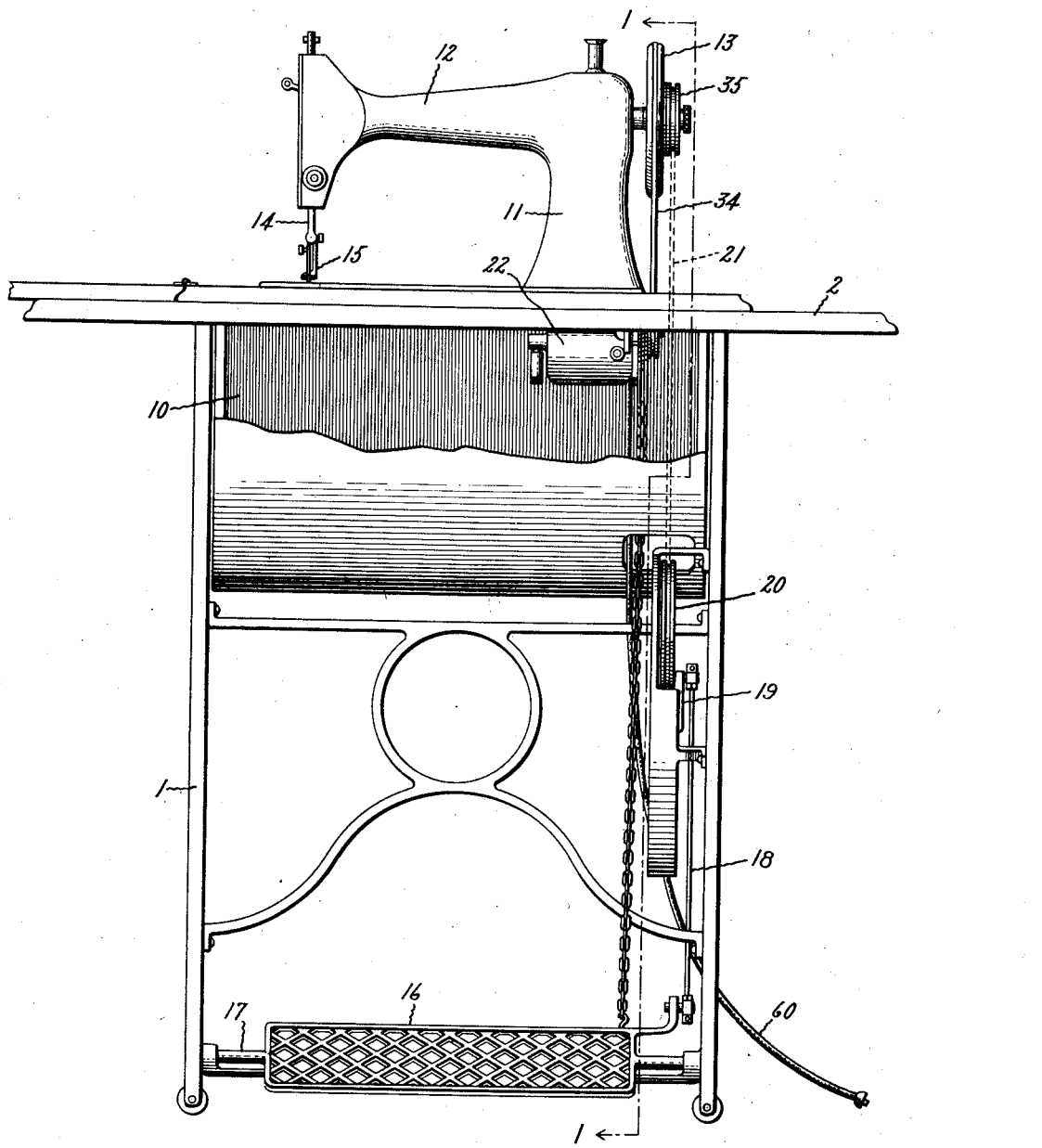
Figure 3:
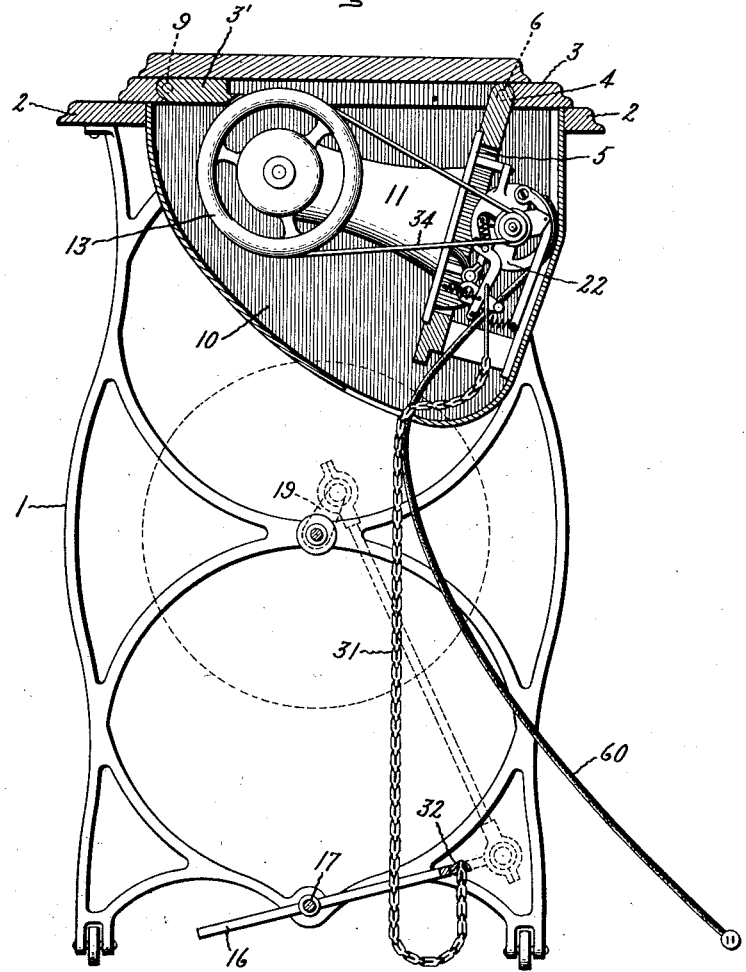
Figure 4:
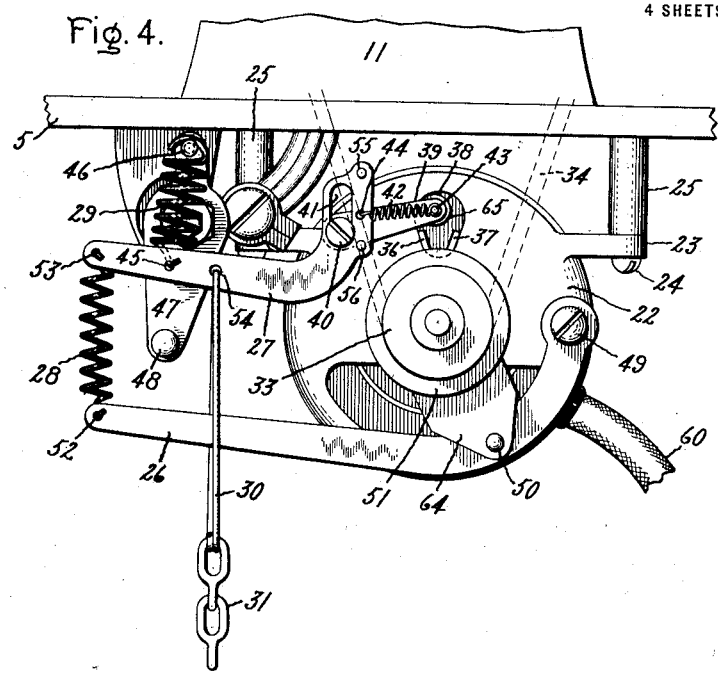

Figure 1 is a transverse vertical section of a sewing machine embodying my invention taken on the line 1—1 of Fig. 2, with the portions outside the plane of section indicated in dotted lines; Fig. 2 is a front elevation with a portion of the machine storage chamber broken away; Fig. 3 is a transverse vertical section with the machine head dropped down in the storage chamber; Fig. 4 is a fragmentary detail view showing the motor with its controlling devices in normal or inoperative position, and Fig. 5 is a view similar to Fig. 4 but with the controlling devices in extreme actuated position.

Referring to the drawings in detail and especially to Figs. 1, 2 and 3, 1 is the supporting stand upon the top of which is mounted the usual table 2 and the machine platform 3 in which is countersunk the supporting base 4 having secured thereto the bed plate 5 of the sewing machine. The supporting base 4 is supported within the platform 3 at the rear by means of the socket hinge 6, and at the front by the ledge or shoulder 7 which engages a complementary ledge 8 on the front portion 3' of the platform 3. This front portion 3' is connected with the table 2 by means of the socket hinge 9 so that it may be lifted out of the path of the machine when the machine and its supporting base are lowered into the storage chamber 10, the base 4 being supported in its lowered position by the stop 10'. The sewing machine proper consists of the usual pillar 11 and horizontal arm 12 which supports the drive wheel 13 and contains the usual mechanism for transmitting motion from the drive wheel to the needle bar 14, and the hollow bed plate 5 containing the usual shuttle and feed mechanism, and means for transmitting motion thereto through the pillar from the drive wheel. The pressure foot 15 is mounted at the free end of the arm in proximity to the needle bar. A foot power mechanism is mounted in the stand 1, consisting of the treadle 16 pivoted to the stand at 17 and adapted to transmit its motion through a connecting rod 18 to the crank 19 of a main drive wheel 20, power being transmitted from said main drive wheel to the drive wheel 35 of the machine by the driving belt 21. These parts may be of any well known or usual construction.

The motor drive for the machine consists of an electric motor 22 attached to the bed plate 5 in any suitable manner, as by means of lugs or brackets 23 and bolts 24 which pass through hollow spacing posts 25. The motor 22 is preferably of high impedance and has its armature and field winding connected in series. It is provided with a brake 64 and switch 65 mounted thereon and operated by the levers 26 and 27 respectively, said levers being provided with retractile springs 28 and 29 respectively. As the motor and its associated parts are carried on the bottom of the bed plate 5, they move with the machine when the latter is swung down into the storage chamber and are contained within the storage chamber and protected thereby, as clearly seen in Fig. 3. An operating or pull device is connected to the switch lever 27 consisting of an elongated link 30, extending downwardly around and below the brake lever 26, and a chain 31. This pull device is adapted to be connected with the far end of the treadle by means of the hook 32 provided for the purpose. This connection, of course, is made only when the motor drive is to be used. Power is transmitted from the driving pulley 33 of the motor to the pulley 13 of the machine by means of a drive belt 34, the driving belt 21 being loosened or disabled whenever the motor drive is used.

Figure 5:
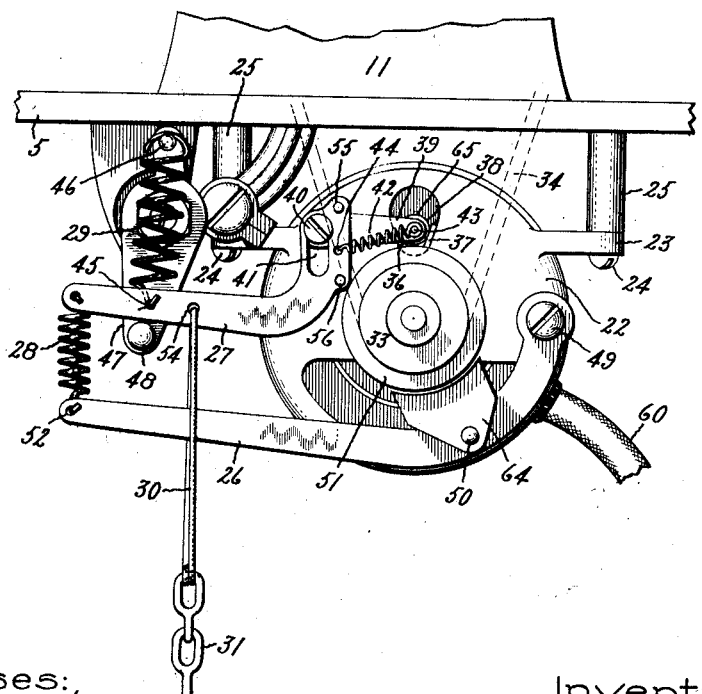

In Figs. 4 and 5, the motor and one form of controlling mechanism is shown in detail. The motor switch 65 consists of the contact members 36, 37 arranged in V-formation and adapted to be bridged by the conducting roller 38. The roller 38 is carried on the end of a switch arm 39 pivoted at 40 to the casing of the motor. The right hand end of the switch lever 27 is provided with an elongated eye or slot 41 which fits over the pivot 40 and slides vertically thereon. A tension spring 42 connects at one end of a pin 43 attached to the free end of the switch arm 39 and at the other end to the switch lever 27 at a point 44 above the line connecting the pin 43 and pivot 40, when the parts are in the normal position shown in Fig. 4. The switch lever 27 is held up in the position shown in Fig. 4 by a relatively strong retractile spring 29 which is connected at one end to the lever at the point 45 and is supported at the other end by a pin 46 fixed in relation to the machine. The pin 46 is carried on the yoke 47 which also carries at its lower end a stop pin 48 for limiting the downward movement of the switch lever 27. The brake lever 26 is pivoted to the motor casing at 49 and carries near its pivoted end a brake shoe 64 pivoted to the lever at 50. This brake shoe is normally held tight against the brake wheel 51 under tension of the relatively weak spring 28 which connects the free end of the brake lever to the free end of the switch lever 27 at points 52 and 53 respectively. A conducting cord or cable 60 is provided for the purpose of effecting connection of the motor with an electrical supply circuit, which may be either direct or alternating current. The switch lever 27 is operated through the link 30 which is connected thereto at the point 54 and passes downwardly free of the brake lever with the chain 31. Suitable stop pins 55 and 56 are carried at the right hand end of the switch lever for bringing the switch lever into positive connection with the switch arm 39 when in either of its extreme positions.

The operation of the machine is as follows: Assuming that the motor driving belt 34, the chain 31 and treadle 16 are connected up as shown in Fig. 1 and that the windings of the motor are connected to a suitable source of current in circuit with the switching means, the operator rocks the treadle so as to gradually pull down on the chain 31. As the chain and its link connection 30 move downward, the switch lever 27 first swings around a point to the left of point 45, the right hand end moving down guided by the slot 41 and pivot 40 until the uppermost end of the slot engages the pivot. As the right hand end of the switch lever 27 moves downward, it carries the point 44 below the line passing through the pin 43 and pivot 40 so that, just before the upper end of the slot 41 strikes the pivot 40, the direction of pull of the spring 39 is shifted to a point below the center of the pivot 40 which causes the switch arm 39 to snap down into the position shown in Fig. 5, bringing the bridging member 38 into engagement with the contacts 36, 37.

When the switch 65 is actuated to closed position as above described, the circuit of the motor is completed and the motor armature and field winding are connected in series directly across the supply circuit without the interposition of any resistance and it therefore immediately exerts its maximum torque, but since the motor windings have high impedance, the amount of current taken from the supply circuit does not greatly exceed full load current. The tension of spring 28 has not, however, been appreciably relieved and consequently the brake 64 is still applied to the motor armature and prevents it from rotating. Further motion of the treadle to pull down on the chain 31 now swings the lever 27 about the pivot 40 and relieves the tension of the spring 28, which relieves the tension on the brake lever 26 and consequently the pressure of the brake 64. The motor armature now begins to rotate, rotating the brake wheel 51 and pulley 33, all of which are connected to rotate together. This motion of the pulley is transmitted to the machine by the drive belt 34 which starts the machine to working. If the tension of spring 28 has been only partially relieved, the pressure of the brake shoe 24 against the brake wheel 51 is only partially reduced so that the motor and machine run at minimum speed. If the chain 31 is moved downward to its lowest limit, the lever 27 swings about the pivot 40 against the tension of the relatively strong spring 29 until it finally strikes the stop pin 48, the downward movement of the free end of the lever 27 reducing the tension of the spring 28 to a minimum which in turn reduces the pressure of the brake shoe 24 on the brake wheel 51 to a minimum. The gradual reduction of the tension of the spring 28 to a minimum, proportionally reduces the pressure of the brake shoe on the brake wheel thereby gradually reducing the braking effect on the armature of the motor and permitting a gradual increase of speed until the limit is reached.

When the treadle 16 is gradually rocked back so as to permit the switch lever 27 to move back into the normal position indicated in Fig. 4, under tension of the relatively strong retractile spring 29, the switch lever first swings upward around the pivot 40, gradually increasing the tension on spring 28 which in turn gradually increases the pressure of the brake shoe on the brake wheel of the motor, thereby causing a gradual reduction in the speed of the motor until the motor is finally brought to a standstill, then the spring 29 causes the right-hand end of the lever 27 to move upward on the pivot 40 until the lower end of the slot 41 strikes said pivot, which upward movement of the lever again carries the point 44 to its normal position above the dead center line as indicated in Fig. 4. As soon as the point 44 reaches its normal position, the direction of pull of the spring 42 is moved above the center of the pivot 40 which causes the switch arm 39 to snap up into the normal disconnected position as indicated in Fig. 4, whereby the circuit of the motor is opened.

It will thus be seen that by this method of control, the use of a rheostat or complicated flexible transmission is done away with, and that the power output of the motor is regulated directly by the pressure of the foot on the treadle, which method of regulation comes most natural to the operator and renders the device easy of operation without special instruction in its use.

It is obvious from the drawings that the machine may be pedally operated by disengaging the belt 34 from the drive wheel 13 and throwing the belt 21 into engagement with the drive wheel 35.

It will be obvious to those skilled in the art that various modifications may be made without departing from the spirit of the invention, and I wish it fully understood that all such modifications are contemplated by me as fall within the scope of the appended claims.

What I claim as new and desire to secure by Letters Patent of the United States, is:—

1. In combination a machine having actuating means, an electric motor adapted to drive said actuating means, and means for controlling said motor comprising a brake for the motor, a switch for the motor supply circuit, means normally holding the brake in engagement to stop the motor, and common actuating means for first closing the switch and thereafter progressively releasing the brake to start the motor and to control the speed thereof.

2. In combination, a machine having actuating means, an electric motor adapted to drive said actuating means, and means for controlling said motor comprising a brake for the motor, a switch for the motor supply circuit, tension means normally maintaining the brake in operative engagement with the motor, other tension means normally maintaining the switch open, and actuating means for first closing the switch under tension and thereafter progressively decreasing the tension on the brake to start the motor and to control the speed thereof.

3. In combination, a machine having actuating means, an electric motor adapted to drive said actuating means, and means for controlling said motor comprising a brake, tension means normally maintaining said brake in operative engagement with the motor, a switch for the motor supply circuit, tension means normally maintaining said switch open, and a common actuating device adapted to be progressively operated and in the course of its operation to first close the switch under tension and thereafter to act upon the tension device of the brake to render the same progressively ineffective, whereby the motor may be started and thereafter its speed may be controlled through its whole range by a continuous progressive motion of the actuating means.

4. In combination, a machine having actuating means, an electric motor adapted to drive said actuating means, and means for controlling said motor comprising a brake drum on the motor spindle, a pivoted brake lever carrying a shoe thereon, a make and break switch for the motor circuit, an actuating lever for said switch, and opposite unequal tension means connecting said lever with the brake lever on the one side and a fixed anchorage on the other, whereby the brake lever is normally maintained under tension and the switch open, but pressure on the switch lever, by first increasing the strain on one tension means and thereafter decreasing the strain on the other, will first close the switch and thereafter progressively release the brake to start the motor and control the speed thereof.

5. In combination, a machine having actuating means, an electric motor adapted to drive said actuating means, said motor having an armature and a field winding connected in series, and means for controlling said motor comprising a switch, a brake, tension means for normally maintaining the brake in engagement with the motor to hold the same stationary, and means for first closing said switch and thereafter progressively decreasing the tension on the brake to start the motor and to control the speed thereof.

6. In combination, an electrical supply circuit, a machine having actuating means, an electric motor having high impedance and adapted to drive said actuating means, said motor having an armature and a field winding connected in series, and means for controlling said motor comprising a brake, tension means for normally maintaining the brake in engagement with the motor to hold the same stationary, means for first connecting said motor directly across said supply circuit and thereafter progressively decreasing the tension on the brake to start the motor and to control the speed thereof.

7. In combination, a machine having actuating means, an electric motor adapted to drive said actuating means, said motor having an armature and field winding connected in series, and means for controlling said motor comprising a brake for the motor, a switch for the motor supply circuit, tension means for normally maintaining the brake in engagement with the motor to hold the same stationary, other tension means normally maintaining the switch open, and actuating means for first closing the switch under tension and thereafter progressively decreasing the tension on the brake to start the motor and to control the speed thereof.

8. In combination, an electrical supply circuit, a machine having actuating means, an electric motor having high impedance and adapted to drive said actuating means, said motor having an armature and a field winding connected in series, and means for controlling said motor comprising a brake for the motor, a switch for connecting said motor directly across the supply circuit, tension means for normally maintaining the brake in engagement with the motor to hold the same stationary, other tension means normally maintaining the switch open, and actuating means for first closing the switch under tension and thereafter progressively decreasing the tension on the brake to start the motor and to control the speed thereof.

9. In combination, a machine, an electric motor connected thereto, means for closing and opening the circuit of the motor direct to the supply circuit without the interposition of resistance, variable braking mechanism, and means for controlling the same and the means for closing and opening the circuit of the motor so as to first close the motor circuit and thereafter start the motor and machine and to mechanically regulate the speed and operation thereof.

10. In combination, an electrical supply circuit, a machine, an electric motor having high impedance connected thereto, means for closing and opening the circuit of the motor direct to said supply circuit without the interposition of resistance, variable braking mechanism, and means for controlling the same and the means for closing and opening the circuit of the motor so as to first close the motor circuit and thereafter start the motor and machine and to mechanically regulate the speed and operation thereof.

11. In combination, an electrical supply circuit, a machine, an electric motor having high impedance operatively connected thereto, said motor having an armature and a field winding connected in series, means for closing and opening the circuit of the motor direct to the supply circuit without the interposition of resistance, variable braking mechanism, and means for controlling the same and the means for closing and opening the circuit of the motor so as to first close the motor circuit and thereafter start the motor and machine and to mechanically regulate the speed and operation thereof.

12. A motor driven sewing machine comprising a bed plate, a pillar rising therefrom, and a driving wheel mounted at the top of the pillar, in combination with a self-contained electric motor secured to the bed plate beneath the base of the pillar with its spindle extending parallel to and beneath the spindle of the driving wheel, together with power transmitting means to connect the motor and the driving wheel.

13. A sewing machine comprising a bed plate, a pillar, a driving wheel on the pillar, and an electric motor having an inclosing iron casing secured to the bed-plate beneath the pillar, means for transmitting power from said motor to the driving wheel of the machine, a brake and a switch pivoted on the casing of the motor, and means for controlling said switch and brake simultaneously to operate the motor and drive the machine.

14. A sewing machine comprising a bed plate, a pillar rising therefrom, and a driving wheel, in combination with a self-contained electric motor with switch and brake mounted as a unit upon and secured to the bed plate directly beneath the pillar with its spindle extending parallel to and beneath the spindle of the driving wheel, together with power transmitting means extending from said motor to the driving wheel.

15. A sewing machine comprising a bed plate, a pillar rising therefrom, and a driving wheel, in combination with a self-contained electric motor with switch and brake mounted as a unit upon the bed plate and directly beneath the pillar with its spindle extending parallel to and beneath the spindle of the driving wheel, together with power transmitting means extending from said motor to the driving wheel, and operating means for the switch and brake extending downward and adapted to be connected to the usual treadle of the machine.

16. A sewing machine comprising a support or stand fitted with a treadle, a bed plate mounted on the stand and carrying a pillar together with a driving wheel, a self-contained electric motor and motor controller mounted as a unit on the lower side of the bed plate beneath the pillar with its spindle extending parallel to and beneath the spindle of the driving wheel, a power transmitting connection adapted to be applied to the motor spindle and the driving wheel, a power controlling connection adapted to be applied between the treadle and the driving wheel, and a pull device adapted to be connected between the treadle and the motor controller.

In witness whereof, I have hereunto set my hand.

ALFRED F. WELCH.

Witnesses:
P. GELLERT,
R. R. ENOCH.

---

Correction in Letters Patent No. 1,193,489.

It is hereby certified that in Letters Patent No. 1,193,489, granted August 1, 1916, upon the application of Alfred F. Welch, of Fort Wayne, Indiana, for an improvement in "Motor-Drives," an error appears in the printed specification requiring correction as follows: Page 1, line 42, for the word "no" read *not;* and that the said Letters Patent should be read with this correction therein that the same may conform to the record of the case in the Patent Office.

Signed and sealed this 5th day of September, A. D., 1916.

[SEAL.]

F. W. H. CLAY,
*Acting Commissioner of Patents.*

Cl. 172—179.